US011619954B2

(12) United States Patent
Fogarty et al.

(10) Patent No.: US 11,619,954 B2
(45) Date of Patent: Apr. 4, 2023

(54) METHOD AND APPARATUS FOR MIXING ADDITIVES INTO A FUEL

(71) Applicant: Icon Scientific Limited, Bath and North East Somerset (GB)

(72) Inventors: Kevin Fogarty, Axbridge (GB); David Hope, Surrey (GB); Dave Thompson, Bristol (GB); Bob Birchmore, Bury (GB)

(73) Assignee: Icon Scientific Limited, Bath and North East Somerset (GB)

( * ) Notice: Subject to any disclaimer, the term of this patent is extended or adjusted under 35 U.S.C. 154(b) by 168 days.

(21) Appl. No.: 17/126,206

(22) Filed: Dec. 18, 2020

(65) Prior Publication Data

US 2021/0103304 A1    Apr. 8, 2021

Related U.S. Application Data

(62) Division of application No. 15/499,284, filed on Apr. 27, 2017, now Pat. No. 11,199,860, which is a division of application No. 13/814,315, filed as application No. PCT/GB2011/051487 on Aug. 5, 2011, now abandoned.

(30) Foreign Application Priority Data

Aug. 5, 2010  (GB) ...................................... 1013202

(51) Int. Cl.
*G05D 11/13*   (2006.01)
*C10L 1/182*   (2006.01)
(52) U.S. Cl.
CPC .......... *G05D 11/138* (2013.01); *C10L 1/1824* (2013.01); *C10L 2290/60* (2013.01)

(58) Field of Classification Search
CPC .. C10L 1/1824; C10L 2290/60; G05D 11/138
See application file for complete search history.

(56) References Cited

U.S. PATENT DOCUMENTS

| 5,600,134 | A | 2/1997 | Ashe et al. |
| 6,258,987 | B1 | 7/2001 | Schmidt et al. |
| 6,679,302 | B1 | 1/2004 | Mattingly et al. |
| 2005/0022446 | A1 | 2/2005 | Brundage et al. |
| 2008/0147241 | A1* | 6/2008 | Tsangaris ............... C10K 1/101 700/273 |
| 2010/0039884 | A1 | 2/2010 | Weathers et al. |
| 2010/0175313 | A1* | 7/2010 | Mattingly ............... C10L 1/023 702/30 |

OTHER PUBLICATIONS

International Search Report for correspondence PCT Application No. PCT/GB2011/051487 dated Feb. 8, 2013.

* cited by examiner

*Primary Examiner* — Ellen M McAvoy
*Assistant Examiner* — Chantel L Graham
(74) *Attorney, Agent, or Firm* — Renner, Otto, Boisselle & Sklar, LLP

(57) ABSTRACT

A method and apparatus for mixing additives into a fluid fuel at a predictable concentration. The method involves taking a sample of the fuel; mixing the additive into the sample in metered proportions; testing the sample to determine that the correct amount of additive is present; storing the remaining fuel until it is time for the fuel to be used; and mixing the additive into the remainder of the fuel in the same metered proportions.

27 Claims, 2 Drawing Sheets

METHOD AND APPARATUS FOR MIXING ADDITIVES INTO A FUEL

This application is a divisional of U.S. patent application Ser. No. 15/499,284 filed Apr. 27, 2017, which is a divisional of U.S. patent application Ser. No. 13/814,315 filed Jun. 17, 2013, which is a national phase of International Patent Application No. PCT/GB2011/051487 filed Aug. 5, 2011, which claims priority of United Kingdom Application No. 1013202.5 filed Aug. 5, 2010, all of which are hereby incorporated by reference.

FIELD OF THE INVENTION

This invention relates to a method and apparatus for mixing additives into a fuel at a predictable concentration.

BACKGROUND TO THE INVENTION

In a bid to reduce the carbon output of motor vehicles, many governments are promoting the use of biofuels as a replacement for petrol. A biofuel will not necessarily produce less carbon than petrol when it is burnt, but since such fuels are typically derived from newly-grown plants or animal products, and since those plants and animals will have absorbed atmospheric carbon directly or indirectly throughout their life, the net carbon output of the fuel can be greatly reduced.

In the US and European markets, suppliers are already required to add a proportion of bioethanol to all grades of gasoline/petrol. In the UK for example, under the Renewable Transport Fuels Obligation, suppliers of fossil fuels must ensure that a specified percentage of the road fuels they supply is made up of renewable fuels. This percentage is currently 3.6929%.

The level of ethanol to be dosed into any particular gasoline blend is driven by marketing and environmental issues. Frequently the supplier will want to control the ethanol levels in gasoline very precisely in order to ensure that they do not add too little, and so break the law, or too much, and so waste resources.

This task is made more challenging by the fact that ethanol is volatile, like most fuels, and its effects on gasoline may be difficult to predict. This is especially problematic if the fuel is to be stored for a long period of time. Therefore merely mixing 5% ethanol with 95% gasoline does not guarantee that the resulting biofuel will eventually pass a test as containing 5% ethanol.

Therefore a system for reliably mixing ethanol and gasoline would be very useful.

SUMMARY OF THE INVENTION

Viewed from one aspect, the present invention provides a method for providing a fuel meeting a predetermined specification of properties. The method comprises taking a sample of the fuel; mixing an additive into the sample in metered proportions; testing the sample to determine that the combination of the fuel and the additive meets the predetermined specification of properties; and storing the remaining fuel without the additive for subsequent mixing with the additive into the remainder of the fuel in the same metered proportion.

In this way, the invention provides a method by which fuel can be adulterated reliably and in a repeatable fashion. Since the fuel is only mixed with the additives when it is time for the fuel to be used, there is little time for the characteristics of the fuel and the additives to change after mixing. Nevertheless, the properties of the fuel in combination with the additive can be guaranteed as a result of the mixing and testing carried out on a sample of the fuel. Since many fuels, such as gasoline and ethanol, are inherently unstable, for example hygroscopic, and may change over time due to, for example, evaporation and reactions with environmental pollutants, mixing at the last possible moment ensures that the characteristics of the fuel remain highly predictable.

One purpose of the method and apparatus described herein is to dose gasoline with a known volume of denatured ethanol prior to analysis of that gasoline by various analyzers in a gasoline blending analyzer house. The user can then predict the effect that adding ethanol to gasoline at the depot will have on the various measured properties. The applicant has found that accuracies of +/−0.02% can be achieved, enough to meet legal requirements in the blending of ethanol with petrol. The predetermined specification of properties may include requirements for properties such as vapor pressure, octane rating and the like, which are commonly determined in order to certify a gasoline blend.

Viewed from an alternative aspect, the invention provides a method for mixing additives into a fuel at a predictable concentration. The method comprises: taking a sample of the fuel; mixing the additive into the sample in metered proportions; testing the sample to determine that the correct amount of additive is present; storing the remaining fuel until it is time for the fuel to be used; and mixing the additive into the remainder of the fuel in the same metered proportions.

Where necessary, the method may further comprise the step of adjusting the metered proportions of the fuel and the additive where testing reveals that the sample contains an incorrect amount of additive, before mixing the additive into the remainder of the fuel in the adjusted metered proportions.

Typically, the fuel and the additive are fluids at the time of mixing. It is advantageous to use fluids where possible, as they are more easily mixed than solid fuels. However solid fuels can still be mixed, for example when they are in the form of powders. One or both of the fuel and the additive may be a liquid at the time of mixing.

Also typically, one of the fuel and the additive comprises a hydrocarbon, which may be distilled from crude oil and may be gasoline. Crude oil fractions, and in particular gasoline, are widely used and frequently need to be mixed with precise quantities of other substances before they are used. Therefore this method may be used for such fuels.

Typically one of the fuel and additives comprises alcohol, and the alcohol will typically comprise ethanol. So for example, the fuel may be gasoline while the additive is ethanol, added to decrease the net carbon output of the fuel. However, it may also be the case that the fuel is ethanol and the additive is petrol, where ethanol is for example to be denatured in order to prevent human consumption. Other chemicals may also be present if required.

It may be that one of the fuel and the additive comprises a bio-fuel, such as a hydrocarbon derived from biomass, for example ethanol derived from fermenting sugar derived from plants, or diesel derived from vegetable oils and animal fats.

The invention also provides an apparatus adapted for carrying out the methods described above, the apparatus comprising: a blending system for incorporating the additive into the fuel; and a sample line for taking off a sample of the mixed additive and fuel for testing.

The blending system may comprise a skid, which can allow the blending system to be easily moved and installed.

Where the fuel and the additive are liquid at the time of mixing, the blending system will typically comprise a plurality of cylinders. Each cylinder will contain a piston, and each cylinder will comprise at least one inlet, through which fuel or additive is supplied to the cylinder.

Typically, each cylinder will comprise a first inlet and a second inlet, one at each end of the cylinder, and a valve which in use alternately directs the fuel or additive to the first inlet or the second inlet. With this arrangement, the piston of each cylinder may be driven solely by the pressure of fluid entering the cylinder.

Also typically, the blending system will comprise a primary cylinder and at least one secondary cylinder, wherein the pistons in the secondary cylinders are arranged to operate in synchrony with the piston in the primary cylinder.

Where the blending system comprises a primary and at least one secondary cylinder, and where each cylinder comprises a first inlet, a second inlet and a valve as described above, the primary cylinder may comprise at least one proximity switch, arranged to operate the valve in the primary cylinder when the piston approaches the end of the primary cylinder. Where this is the case, the proximity switch in the primary cylinder may also be arranged to operate the valves in the secondary cylinders.

Typically, the apparatus comprises a heat exchanger, and the fuel and the additive are put through opposite sides of the heat exchanger prior to mixing. This helps to ensure that the fuel and the additive are the same temperature when they are mixed, and allows them to be mixed more accurately.

Particularly with the volatile fluids used as fuels, changes in temperature can lead to changes in volume and other characteristics that can make controlling the proportions mixed difficult. Therefore the temperature of a blending system according to the invention is typically controlled, in order to control the temperature of the fuel and the additive. The blending system, and in particular the cylinders where used, may therefore be mounted inside a temperature controlled enclosure.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION OF PREFERRED EMBODIMENTS

Preferred embodiments of the present invention will now be described with particular reference to a method for incorporating additives into a fluid fuel.

Figure 1:
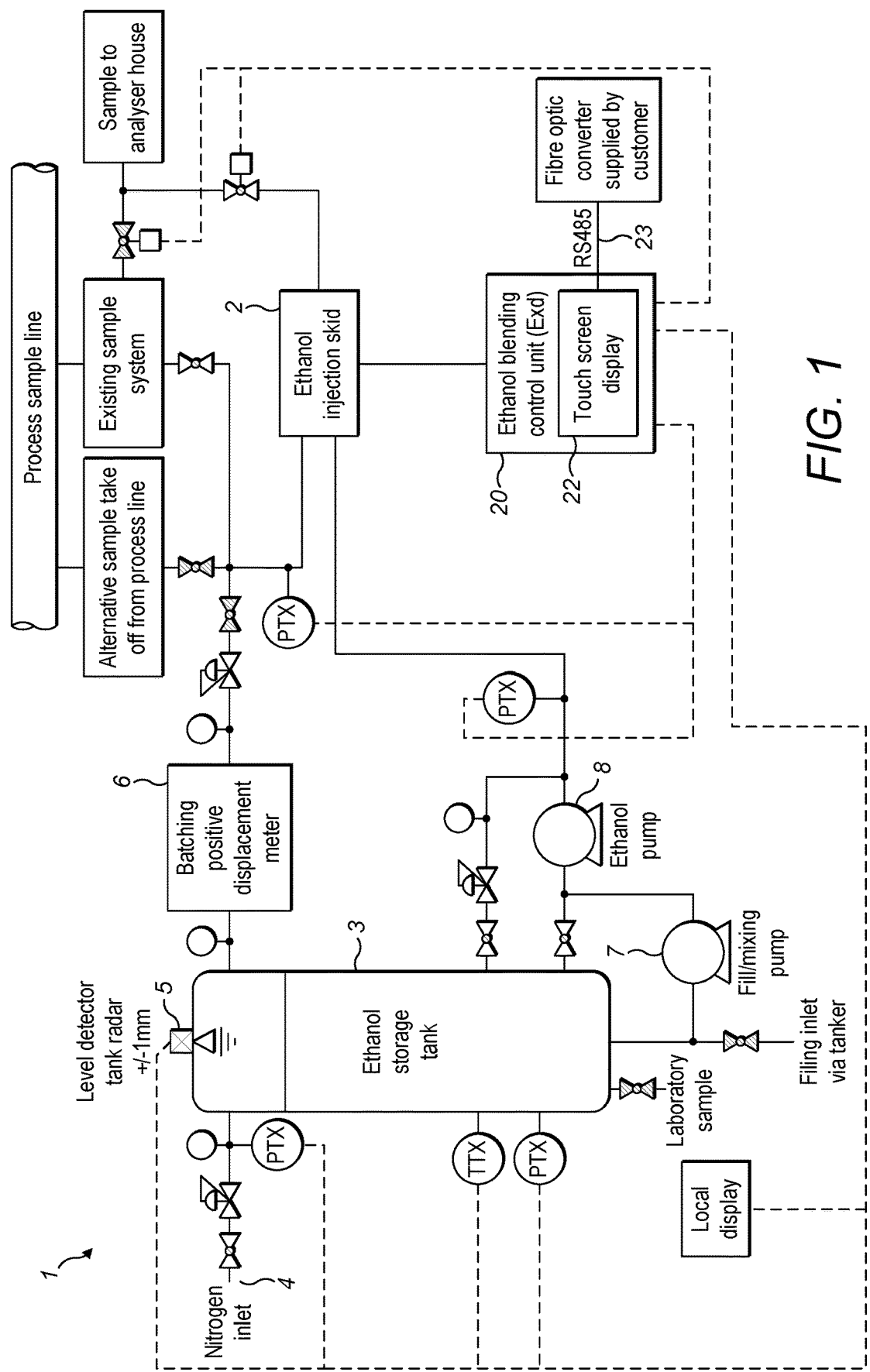
FIG. 1 is a diagram of an ethanol blending system according to the invention.

FIG. 1 shows an ethanol blending system 1 according to the invention. The ethanol blending system 1 is designed to produce a dosing accuracy of +/−0.02% volume, so for example if the required dosing level is 5% ethanol by volume, the dosage level provided by the ethanol blending system 1 will be in the range 4.98-5.02%.

Figure 2:
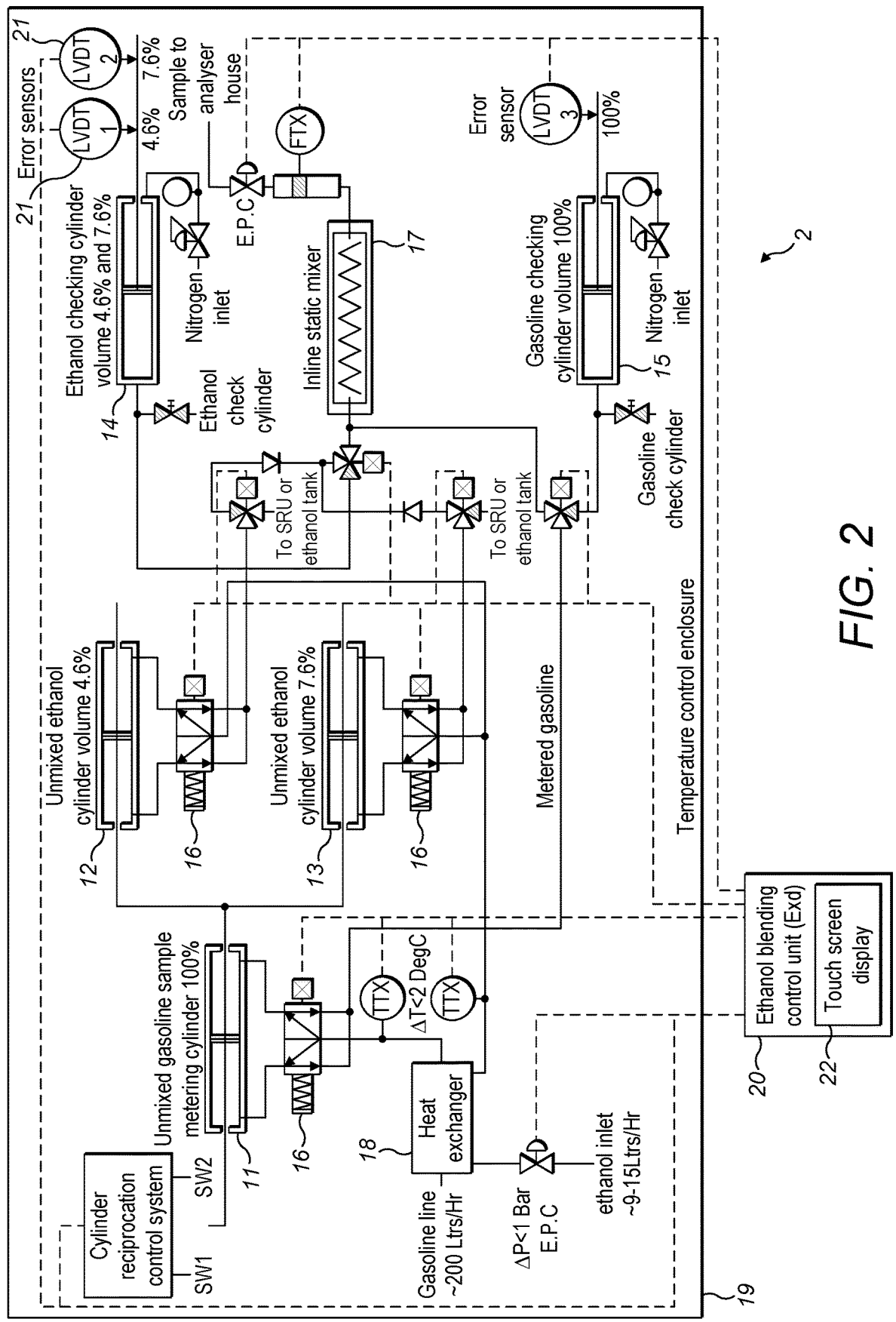
FIG. 2 is an illustration of an ethanol injection skid, also according to the invention.

The ethanol blending system 1 comprises two main parts, the ethanol storage skid and the ethanol injection skid 2 (shown in more detail in FIG. 2). The ethanol blending system 1 is comprised of skids, i.e. constructed on pallets, so that it can be easily moved and installed. Once the blending system is connected to the required tanks of fuel it can begin to operate without extensive installation or construction.

Generally the ethanol injection skid will be installed close to a process analyzer so that fuel mixes can be quickly analyzed to confirm that they meet the required specification of properties. The ethanol storage skid may be located with the injection skid or at some distance away, connected by pipes.

The ethanol storage skid comprises an ethanol storage tank 3. The capacity of the tank is determined by the needs of the user, and therefore by the required ethanol dosage level for the relevant market, the demand of the installed analyzers and the length of the gasoline blend run. Generally the tank capacity will be between 1,000 and 15,000 liters. The ethanol storage tank 3 shown in FIG. 1 is made from austenitic stainless steel, but materials can be used depending on the user's requirements.

The ethanol storage tank 3 is equipped with a nitrogen blanketing system 4, which operates using dry plant nitrogen to maintain an overpressure of 5 millibars in the headspace above the ethanol. This is to prevent water being absorbed into the ethanol from the atmosphere surrounding the tank.

Ethanol storage tanks according to the invention are typically fitted with a visual level indicator and level monitoring systems so that the remaining ethanol can be easily determined. The ethanol storage tank 3, for example, is provided with a Guided Wave Radar (GWR) level detection system 5 operating over the main length of the tank. This allows the level in the tank to be determined to within +/−1 mm.

It is common for a denaturing agent to be added to the ethanol to render it unfit for human consumption. Often, the denaturing agent is gasoline, and the concentration of the denaturing agent must be accurately controlled as this accuracy will have an effect upon the accuracy of the final ethanol/gasoline blend. Therefore ethanol storage tank 3 is provided with a temperature compensated mechanical positive displacement flow meter arrangement 6 with a presettable totalizer and automatic shut off valve to allow the user to add the required amount of denaturing agent. The accuracy of this flow meter is typically 0.05%.

Depending upon the capacity of an ethanol storage tank 3 according to the invention it may be equipped with one or two single- or three-phase electrically driven pump units 7, 8 complete with contactors and thermal overload trips. These pumps will be used either singly or in conjunction to mix the tank contents and provide a pressurized supply of ethanol to the injection skid.

All electrical components in the ethanol blending system 1 are supplied with suitable hazardous area certification to meet the client's local requirements, which will vary from country to country.

The ethanol blending system 1 also comprises an ethanol injection skid 2, which will mix gasoline from the user's process line with the required amount of (often denatured) ethanol and supply the mixture at the required pressure and flow rate to meet the requirements of the installed on-line gasoline analyzers.

The ethanol injection skid 2 is shown in FIG. 2, and comprises a set of precision volumetric cylinders and pistons 11, 12, 13, 14, 15 with a minimum certified accuracy of +/−0.02%. The master gasoline cylinder 11 represents a volume of 100%. This cylinder reciprocates and works as a double acting pump. The motive force to operate the master gasoline cylinder 11 is provided by the gasoline pressure in the process sample line, so no other energy source is required. High pressure samples enter on one side of the cylinder and force samples out of the other side to a lower pressure, so supplying the fuel to the rest of the ethanol injection skid 2 and eventually to the analyzer house. The master gasoline cylinder 11 comprises solenoid valves 16 suitable for switching the high and low pressure sides of the cylinder and proximity switches attached to the piston shaft. Therefore, at the end of each stroke of the piston, the proximity switches will activate solenoid valves 16, redirecting the pressure so that the piston is driven back along the cylinder. In this way the master gasoline cylinder 11 can operate automatically and continuously without any outside power source.

The master gasoline cylinder 11 is attached to two secondary cylinders 12, 13. In other embodiments of the invention, there may be only one secondary cylinder, or there may be three or more. Each secondary cylinder has a volume corresponding to the fraction of the volume of the gasoline master cylinder that gives the ethanol percentage required. In the ethanol injection skid 2 the user can choose between a mix of 4.6% ethanol and a mix of 7.6% ethanol by selecting which secondary cylinder to use. The user can also select a mix of 12.2% by using both cylinders.

In use, the secondary cylinders 12, 13 reciprocate with the master gasoline cylinder 11 and use solenoid valves 16 activated by the same proximity switches to act as double acting pumps. In a multi cylinder installation such as the ethanol injection skid 2, any cylinder which is not in use will just re-circulate denatured ethanol back into the ethanol supply line from the ethanol storage tank 3. The cylinder which is in use will pump a metered supply of denatured ethanol into a static mixer 17, along with the metered gasoline, for supply to the analyzer house.

The user is therefore able to select which secondary cylinder is used, and hence the volume of ethanol added. The user can also bypass the system altogether if non-ethanol-containing gasoline is required.

Piston stroke length errors are eliminated in the ethanol injection skid 2, as all cylinders are rigidly coupled and are controlled by the same proximity switches. Therefore any variation in stroke length will apply equally to all cylinders, and so mixing ratios will be maintained.

To maintain the required accuracy it is important that during the pumping cycles the gasoline and ethanol are at the same temperature to avoid errors due to their differential thermal expansion rates. Therefore, to minimize temperature differentials the ethanol and gasoline flow through opposite sides of a heat exchanger 18 and the cylinders are mounted inside a temperature controlled enclosure 19. The temperature of the ethanol and gasoline are monitored by the control system 20 of the ethanol blending system 1, and the system is designed to maintain the temperatures of the two fuels closer than 2° C.

To eliminate any potential errors due to differences in the compressibility of gasoline and ethanol the gasoline and ethanol pressure is also monitored by the control system 20, and the ethanol pressure can be electronically controlled to track the gasoline pressure at a level of 0.5 bars or better.

There are two ways to check the accuracy of the master gasoline cylinder 11 and the secondary cylinders 12, 13. Firstly, a pair of check cylinders 14, 15 and pistons are provided. The output of the master gasoline cylinder 11 can be used to fill the larger of the check cylinders, the gasoline check cylinder 15. To ensure that the pistons of the gasoline check cylinder are at the zero position, and to prevent any vaporization, the opposite side of the pistons is slightly pressurized with nitrogen or air, in use. When the gasoline check cylinder is full the extension of the piston shaft, which is proportional to the volume in the check cylinder, is measured by an LVDT (Linear Variable Differential Transformer) sensor 21 and compared to a set point value. Any deviation beyond the set point value will be notified by the control system.

The second smaller check cylinder is the ethanol check cylinder 14, and is used for checking the ethanol delivery. It operates in exactly the same way as the gasoline check cylinder 15, except that it is provided with one LVDT sensor 21 for each secondary cylinder 12, 13. Each LVDT sensor 21 measures a set point corresponding to the ethanol dosing level of a particular secondary cylinder 12, 13.

This procedure of checking the cylinders can be carried out manually, or the control unit 20 can initiate periodic tests automatically according to user preference.

Another way to test the accuracy of the ethanol injection skid 2 is to dye the ethanol while it is still in the ethanol storage tank 3, using a suitable dye such as Sudan Blue, which is a common petroleum dye. A reference blend of gasoline and dyed ethanol is then made at the desired accuracy level, and this blend is used as the reference for a highly sensitive dual channel online spectrophotometer tuned to monitor the light absorbance of the dye. The measuring channel of the spectrometer monitors the output from the ethanol injection skid 2. Any difference in light absorbance will be directly proportional to the difference in ethanol concentration. This enables a continuous check to be carried out of the blending accuracy. Alternatively, this procedure can be used as a spot check using a laboratory-based spectrophotometer.

Early seal leak detection is carried out by a flammable vapor detector installed within the injection skid housing close to the cylinders.

The ethanol blending system 1 also comprises a control unit 20. The control unit 20 is based on a rugged fan-less industrial PC with solid state memory, eliminating the need for more vulnerable magnetic hard drives. The PC operates under the Linux operating system. The GUI (Graphical User Interface) is provided by an armored 17" glass touch screen 22, suitable for direct operation by gloved or un-gloved hands. The control unit 20 accepts analogue and digital inputs from all parts of the system including the ethanol storage tank 3, and provides the operator with an overview of the system status on a graphic mimic display. The operator can control the system fully from the GUI, and carry out tasks such as selecting the gasoline grades and setting alarm levels. The control unit 20 maintains a record of the number of cylinder and valve operations as an aid to maintenance. The control unit 20 does not control the cylinder operation, as this is done by hardwired proximity switches and relays, but the unit does monitor all the associated parameters. The control unit 20 is mounted in an explosion proof box suitable for the local hazardous area rating. The touch screen 22 forms part of the explosion proof box.

While an ethanol blending system 1 according to the invention can be provided with some hardwired alarms if required, for example for a high or low tank, or a fatal alarm, it is envisaged that the primary output will be via a RS485 modbus link 23 from the control unit 20. If required the modbus link 23 may be used to control the system remotely, selecting the grades and performing calibration checking on demand. At all times local control will take precedence over remote control.

The control unit 20 will typically be located with the ethanol injection skid 2. The ethanol storage tank is therefore provided with a local mimic display in order to display all parameters associated with the tank.

Accuracy is essential to the operation of the invention. Therefore several measures have been taken to ensure that sufficient accuracy is maintained. Most of these measures have been discussed above, but we offer a more detailed discussion here.

Inaccuracy Due to Thermal Expansion in the Ethanol Storage Tank

The ethanol storage tank 3 will also expand and contract with temperature and so will the ethanol contents with one effect countering the other. The tank expansion is minimal compared to the ethanol expansion.

For example, assuming we have a 2.25 m diameter tank this will have an initial circumference of 7.0685 m at an initial temperature. The coefficient of linear expansion of grade 316 stainless steel is 15.9 $\mu$m/m/° C. If we assume a 20° C. rise from the initial temperature the new circumference will be 7.0685+((15.9×7.0685×20)/1,000,000)=7.0707 m. The cross sectional area at the initial condition=3.9761 Sqm and the cross sectional area at +/−20° C. condition=3.9785 Sqm. The difference is 0.0024 SqM. As the tank level for any capacity is directly related to cross sectional area, the error would be 0.0024/7.0685×15,000=5.09 L. This is for a 20° C. change so for a 1° C. temperature change this will be 0.25 L or 0.0017%. While the tank is expanding, the ethanol will also be expanding. The coefficient of cubical expansion of ethanol is 0.00109/° C. or 0.109%. The effective expansion is therefore 0.109−0.0017=0.102%/° C.

A similar calculation can be carried out for the gasoline, making the assumption that the internals of the positive displacement meter do not change significantly with temperature compared to the change of the gasoline volume.

It is helpful, therefore, to measure the temperature of the ethanol and the gasoline in the tanks and correct the volume to a 20° C. reference.

Inaccuracy Due to Denaturing of the Ethanol

As mentioned above, ethanol in the ethanol storage tank 3 will often be denatured by adding 1% volume of gasoline to the tank. Taking into account the accuracy of the tank gauging and the accuracy of the gasoline addition it should be possible to achieve a 1.00%+/−0.004% Gasoline addition (between 0.996 and 1.004%).

As this gasoline will be contained in only 4.6 to 7.6% of the final blend the error contribution will be small but the gasoline content of the ethanol must be taken into account in the final blending if the desired mix is to be reached.

For example, if the user wishes to mix 100 volumes of gasoline and 4.6 volumes of ethanol they will need to add slightly more ethanol as the ethanol already contains 1 gasoline. So the user must add 4.6/0.99×100=4.64646 volumes of denatured ethanol. This 4.64646 volumes has 4.64646×0.01=0.04646 volumes of gasoline so we must add 100−0.04646=99.9535 volumes of gasoline to it to achieve the 100:4.6 ratio. If we correct the gasoline value back to 100% we need to add 4.64862 (4.65) volumes of denatured ethanol to 100 volumes of gasoline to get a 100:4.6 ratio. A similar calculation would need to be applied achieve a 7.6% addition, or any other desired amount.

Furthermore, where the ethanol is denatured by adding gasoline before use, accurate tank gauging is required. The accuracy of this gauging will be affected by the accuracy of the tank dimensions. Typically, in embodiments of this invention, it is assumed that the tank is perfectly round and that therefore a level measurement on the straight part of the tank will be directly related to the tank contents. However, the ethanol blending system 1 can be calibrated more accurately by filling the ethanol storage tank 3 with water, and measuring the level reached for known volumes of fluid.

Inaccuracy Due to Thermal Expansion in the Ethanol Injection Skid

Gasoline and ethanol expand/contract at slightly different rates with temperature, ethanol at 0.109%/° C., gasoline at 0.100%/° C. The pistons and cylinders will also expand and contract with temperature. As with the tank above, the effect of expansion on the cylinders and pistons is minimal, of the order of 0.0017%/° C. in terms of volume.

As long as the gasoline and ethanol cylinders are kept at the same temperature this effect is compensated for. Also as long as the temperatures of the cylinders are exactly the same the mixing ratio would be maintained over quite a wide temperature range (>+/−10° C.). However, if the temperatures differ the expansion effects are more severe. The ratio would be theoretically maintained within a +/−3° C. temperature difference. So the target for the overall temperature control in the ethanol blending system 1 is to ensure that the differential temperatures do not exceed 1 to 2° C.

Inaccuracy Due to Fluid Compression

Both alcohol and gasoline are compressible to some extent. Once again the rates differ, especially for gasoline which does not have a constant composition. Ethanol is compressible to the extent of about 0.01%/bar, while gasoline is less compressible. Also the degree of compressibility decreases with pressure, which makes the effects of compressibility hard to predict.

Ideally the mixing should be carried out at atmospheric pressure, or as low a pressure as possible to eliminate the potential of compressibility errors. Typically, a system according to the invention is limited by the pressure requirements of the installed analyzers to a minimum pressure of 7 bars.

To minimize compressibility errors the pressure of the ethanol is maintained close to the pressure of the incoming gasoline by means of an electrically controlled pressure regulator.

Testing

For factory acceptance testing the function and accuracy of the ethanol blending system 1 is determined gravimetrically using water, as described above. A gravimetric procedure is also used to calibrate the check cylinder volumes.

For site acceptance testing and routine checking the check cylinders are used, as also described above. Alternatively, gas chromatography can be used for testing accuracy. Lastly, a photometric method using a suitable spectrometer and Sudan Blue Dye can also be used.

The ethanol used would not be 100% pure so the level of impurities in the ethanol and the added gasoline would have to be taken into account. Therefore any check would also involve determining the ethanol content of the tank as well as the ethanol content of the blend.

The invention claimed is:

1. An apparatus for incorporating an additive into a fuel in metered proportions, the apparatus comprising:
   a blending system for incorporating the additive into the fuel; and
   a sample line for taking off a sample of the mixed additive and fuel for testing, wherein the blending system comprises a plurality of cylinders, including a primary cylinder and one or more secondary cylinders, wherein each cylinder contains a piston wherein the pistons in the one or more secondary cylinders are arranged to operate in synchrony with the piston in the primary cylinder such that any variation in stroke length of the pistons will apply equally to the primary and one or more secondary cylinders.

2. A method for providing a fuel meeting a predetermined specification of properties, the method comprising:
taking a sample of the fuel;
mixing an additive into the sample in metered proportions;
testing the sample to determine that the combination of the fuel and the additive meets the predetermined specification of properties;
adjusting the fuel where testing reveals that the sample does not meet the predetermined specification of properties; and
storing the remaining fuel without the additive for subsequent mixing with the additive into the remainder of the fuel in the same metered proportion; and wherein the mixing of the additive into the sample in metered proportions is carried out using the apparatus of claim 1.

3. The method as claimed in claim 2, wherein the fuel and the additive are liquid at the time of mixing.

4. The method as claimed in claim 1, wherein the fuel is a hydrocarbon.

5. The method as claimed in claim 4, wherein the fuel comprises gasoline.

6. The method as claimed in claim 5, wherein the additive comprises ethanol.

7. The apparatus as claimed in claim 6, wherein the blending system comprises a skid.

8. The apparatus as claimed in claim 6, wherein each cylinder comprises at least one inlet, through which fuel or additive is supplied to the cylinder.

9. The apparatus as claimed in claim 8, wherein each cylinder comprises a first inlet and a second inlet, one at each end of the cylinder, and a valve which in use alternately directs the fuel or additive to the first inlet or the second inlet.

10. The apparatus as claimed in claim 8, wherein, in use, the piston of each cylinder is driven solely by the pressure of fluid entering the cylinder.

11. The apparatus as claimed in claim 6, wherein each cylinder comprises a first inlet and a second inlet, one at each end of the cylinder, and a valve which in use alternately directs the fuel or additive to the first inlet or the second inlet, and wherein the primary cylinder comprises at least one proximity switch, arranged to operate the valve in the primary cylinder when the piston approaches the end of the primary cylinder.

12. The apparatus as claimed in claim 11, wherein the proximity switch in the primary cylinder is also arranged to operate the valves in the one or more secondary cylinders.

13. The apparatus as claimed in claim 6, wherein the apparatus comprises a heat exchanger, and the fuel and the additive are put through opposite sides of the heat exchanger prior to mixing.

14. The apparatus as claimed in claim 6, wherein the cylinders are mounted inside a temperature controlled enclosure.

15. The apparatus as claimed in claim 6, wherein each of the one or more secondary cylinders has a volume corresponding to the fraction of the volume of the primary cylinder.

16. The apparatus as claimed in claim 12, wherein all cylinders are rigidly coupled and are controlled by the same proximity switches.

17. The apparatus as claimed in claim 12, wherein the one or more secondary cylinders reciprocate with the primary cylinder and use solenoid valves activated by the same proximity switches to act as double acting pumps.

18. The apparatus as claimed in claim 6, wherein the cylinders are configured to pump a metered supply of additive.

19. The apparatus as claimed in claim 6, further comprising check cylinders and pistons wherein the output of the primary cylinder can be used to fill a larger check cylinder and the output of one or more secondary cylinders can be used to fill one or more smaller check cylinders.

20. The apparatus as claimed in claim 6, wherein the blending system produces a dosing accuracy of ±0.02% volume.

21. The apparatus as claimed in claim 6, wherein the cylinders and pistons are precision volumetric cylinders and pistons with a minimum certified accuracy of +/−0.02%.

22. The apparatus as claimed in claim 6, wherein a master gasoline cylinder is attached to one or more of the secondary cylinders.

23. The apparatus as claimed in claim 22, wherein each secondary cylinder has a volume corresponding to a fraction of the volume of the master gasoline cylinder that gives a prescribed ethanol percentage.

24. The apparatus as claimed in claim 6, wherein each piston in the one or more secondary cylinders is rigidly coupled with the piston in the primary cylinder.

25. An apparatus comprising:
a blending system for incorporating an additive into a fuel to provide a mixed additive and fuel; and
a sample line for taking off a sample of the mixed additive and fuel for testing,
wherein the blending system comprises a plurality of cylinders, including a primary cylinder and one or more secondary cylinders, wherein each cylinder contains a piston wherein the pistons in the secondary cylinders are arranged to operate in synchrony with the piston in the primary cylinder;
wherein each cylinder comprises at least one inlet, through which fuel or additive is supplied to the cylinder; and
wherein, in use, the piston of each cylinder is driven solely by the pressure of fluid entering the cylinder.

26. An apparatus comprising:
a blending system for incorporating an additive into a fuel to provide a mixed additive and fuel; and
a sample line for taking off a sample of the mixed additive and fuel for testing,
wherein the blending system comprises a plurality of cylinders, including a primary cylinder and one or more secondary cylinders, wherein each cylinder contains a piston wherein the pistons in the secondary cylinders are arranged to operate in synchrony with the piston in the primary cylinder;
wherein each cylinder comprises a first inlet and a second inlet, one at each end of the cylinder, and a valve which in use alternately directs the fuel or additive to the first inlet or the second inlet, and wherein the primary cylinder comprises at least one proximity switch, arranged to operate the valve in the primary cylinder when the piston approaches the end of the primary cylinder.

27. The apparatus as claimed in claim 26, wherein the proximity switch in the primary cylinder is also arranged to operate the valves in the one or more secondary cylinders.

* * * * *

UNITED STATES PATENT AND TRADEMARK OFFICE
CERTIFICATE OF CORRECTION

| | |
|---|---|
| PATENT NO. | : 11,619,954 B2 |
| APPLICATION NO. | : 17/126206 |
| DATED | : April 4, 2023 |
| INVENTOR(S) | : Kevin Fogarty et al. |

It is certified that error appears in the above-identified patent and that said Letters Patent is hereby corrected as shown below:

In the Claims

Replace Column 8, Line 61-Column 11, Line 7, (approx.) with the following Claims:
1. An apparatus for incorporating an additive into a fuel in metered proportions, the apparatus comprising:
    a blending system for incorporating the additive into the fuel; and
    a sample line for taking off a sample of the mixed additive and fuel for testing,
    wherein the blending system comprises a plurality of cylinders, including a primary cylinder and one or more secondary cylinders, wherein each cylinder contains a piston wherein the pistons in the one or more secondary cylinders are arranged to operate in synchrony with the piston in the primary cylinder such that any variation in stroke length of the pistons will apply equally to the primary and one or more secondary cylinders.
2. A method for providing a fuel meeting a predetermined specification of properties, the method comprising:
    taking a sample of the fuel;
    mixing an additive into the sample in metered proportions;
    testing the sample to determine that the combination of the fuel and the additive meets the predetermined specification of properties;
    adjusting the fuel where testing reveals that the sample does not meet the predetermined specification of properties; and
    storing the remaining fuel without the additive for subsequent mixing with the additive into the remainder of the fuel in the same metered proportion; and wherein the mixing of the additive into the sample in metered proportions is carried out using the apparatus of claim 1.
3. The method as claimed in claim 2, wherein the fuel and the additive are liquid at the time of mixing.
4. The method as claimed in claim 3, wherein the fuel is a hydrocarbon.
5. The method as claimed in claim 4, wherein the fuel comprises gasoline.
6. The method as claimed in claim 5, wherein the additive comprises ethanol.
7. The apparatus as claimed in claim 1, wherein the blending system comprises a skid.

Signed and Sealed this
Twentieth Day of February, 2024

*Katherine Kelly Vidal*

Katherine Kelly Vidal
*Director of the United States Patent and Trademark Office*

8. The apparatus as claimed in claim 1, wherein each cylinder comprises at least one inlet, through which fuel or additive is supplied to the cylinder.
9. The apparatus as claimed in claim 8, wherein each cylinder comprises a first inlet and a second inlet, one at each end of the cylinder, and a valve which in use alternately directs the fuel or additive to the first inlet or the second inlet.
10. The apparatus as claimed in claim 8, wherein, in use, the piston of each cylinder is driven solely by the pressure of fluid entering the cylinder.
11. The apparatus as claimed in claim 1, wherein each cylinder comprises a first inlet and a second inlet, one at each end of the cylinder, and a valve which in use alternately directs the fuel or additive to the first inlet or the second inlet, and wherein the primary cylinder comprises at least one proximity switch, arranged to operate the valve in the primary cylinder when the piston approaches the end of the primary cylinder.
12. The apparatus as claimed in claim 11, wherein the proximity switch in the primary cylinder is also arranged to operate the valves in the one or more secondary cylinders.
13. The apparatus as claimed in claim 1, wherein the apparatus comprises a heat exchanger, and the fuel and the additive are put through opposite sides of the heat exchanger prior to mixing.
14. The apparatus as claimed in claim 1, wherein the cylinders are mounted inside a temperature controlled enclosure.
15. The apparatus as claimed in claim 1, wherein each of the one or more secondary cylinders has a volume corresponding to the fraction of the volume of the primary cylinder.
16. The apparatus as claimed in claim 12, wherein all cylinders are rigidly coupled and are controlled by the same proximity switches.
17. The apparatus as claimed in claim 12, wherein the one or more secondary cylinders reciprocate with the primary cylinder and use solenoid valves activated by the same proximity switches to act as double acting pumps.
18. The apparatus as claimed in claim 1, wherein the cylinders are configured to pump a metered supply of additive.
19. The apparatus as claimed in claim 1, further comprising check cylinders and pistons wherein the output of the primary cylinder can be used to fill a larger check cylinder and the output of one or more secondary cylinders can be used to fill one or more smaller check cylinders.
20. The apparatus as claimed in claim 1, wherein the blending system produces a dosing accuracy of ±0.02% volume.
21. The apparatus as claimed in claim 1, wherein the cylinders and pistons are precision volumetric cylinders and pistons with a minimum certified accuracy of +/- 0.02%.
22. The apparatus as claimed in claim 1, wherein a master gasoline cylinder is attached to one or more of the secondary cylinders.
23. The apparatus as claimed in claim 22, wherein each secondary cylinder has a volume corresponding to a fraction of the volume of the master gasoline cylinder that gives a prescribed ethanol percentage.
24. The apparatus as claimed in claim 1, wherein each piston in the one or more secondary cylinders is rigidly coupled with the piston in the primary cylinder.
25. An apparatus comprising:
 a blending system for incorporating an additive into a fuel to provide a mixed additive and fuel; and
 a sample line for taking off a sample of the mixed additive and fuel for testing, wherein the blending system comprises a plurality of cylinders, including a primary cylinder and one or more secondary cylinders, wherein each cylinder contains a piston wherein the pistons in the secondary cylinders are arranged to operate in synchrony with the piston in the primary cylinder;

wherein each cylinder comprises at least one inlet, through which fuel or additive is supplied to the cylinder; and wherein, in use, the piston of each cylinder is driven solely by the pressure of fluid entering the cylinder.

26. An apparatus comprising:

a blending system for incorporating an additive into a fuel to provide a mixed additive and fuel; and a sample line for taking off a sample of the mixed additive and fuel for testing, wherein the blending system comprises a plurality of cylinders, including a primary cylinder and one or more secondary cylinders, wherein each cylinder contains a piston wherein the pistons in the secondary cylinders are arranged to operate in synchrony with the piston in the primary cylinder;

wherein each cylinder comprises a first inlet and a second inlet, one at each end of the cylinder, and a valve which in use alternately directs the fuel or additive to the first inlet or the second inlet, and wherein the primary cylinder comprises at least one proximity switch, arranged to operate the valve in the primary cylinder when the piston approaches the end of the primary cylinder.

27. The apparatus as claimed in claim 26, wherein the proximity switch in the primary cylinder is also arranged to operate the valves in the one or more secondary cylinders.